July 22, 1969
L. E. BOWMAN
3,456,670
MIXING VALVE
Filed July 18, 1966
3 Sheets-Sheet 1
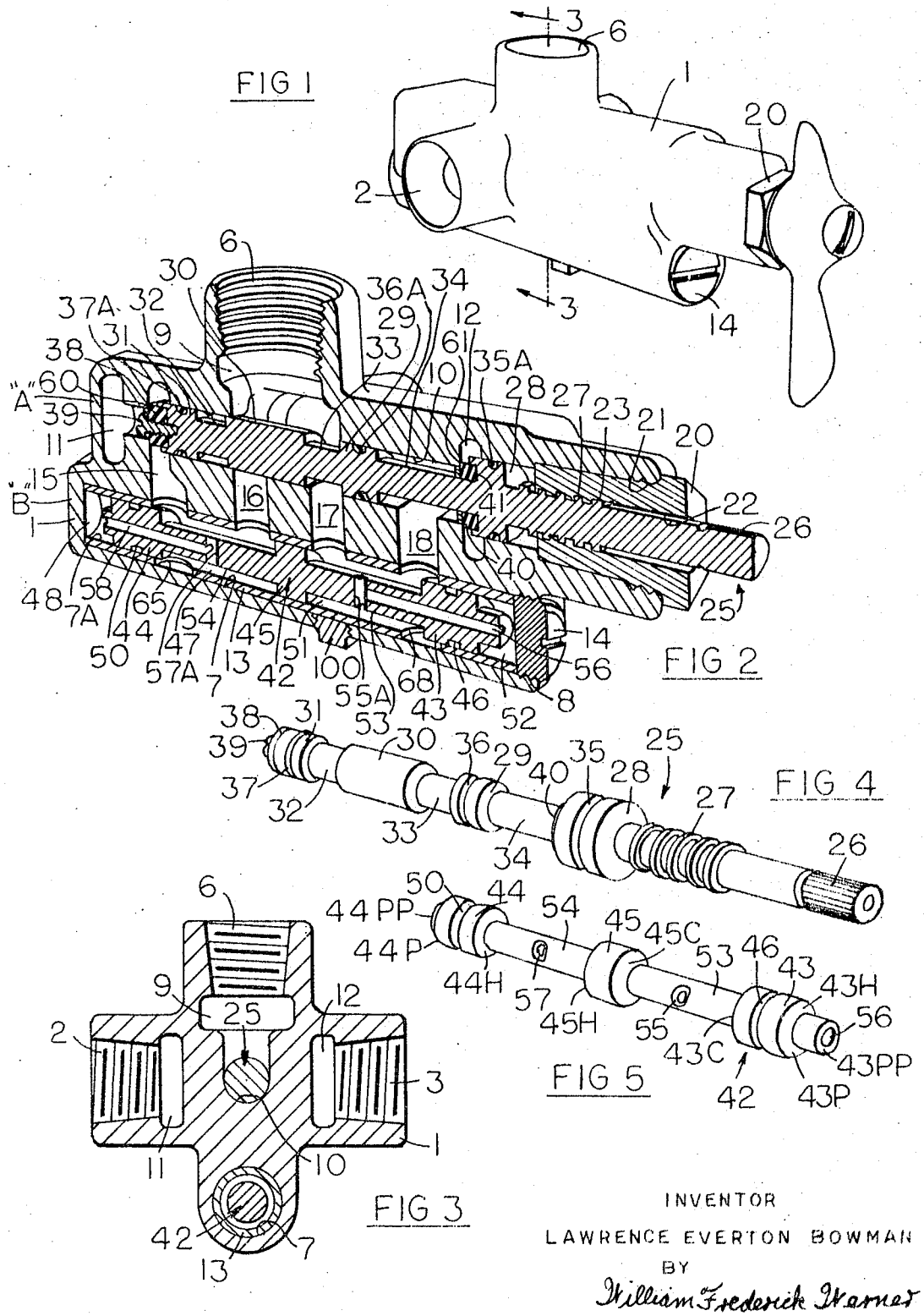
INVENTOR
LAWRENCE EVERTON BOWMAN
BY
William Frederick Warner
ATTORNEY July 22, 1969     L. E. BOWMAN     3,456,670
MIXING VALVE
Filed July 18, 1966     3 Sheets-Sheet 2
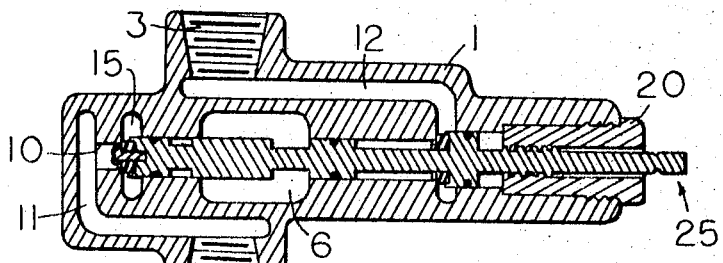
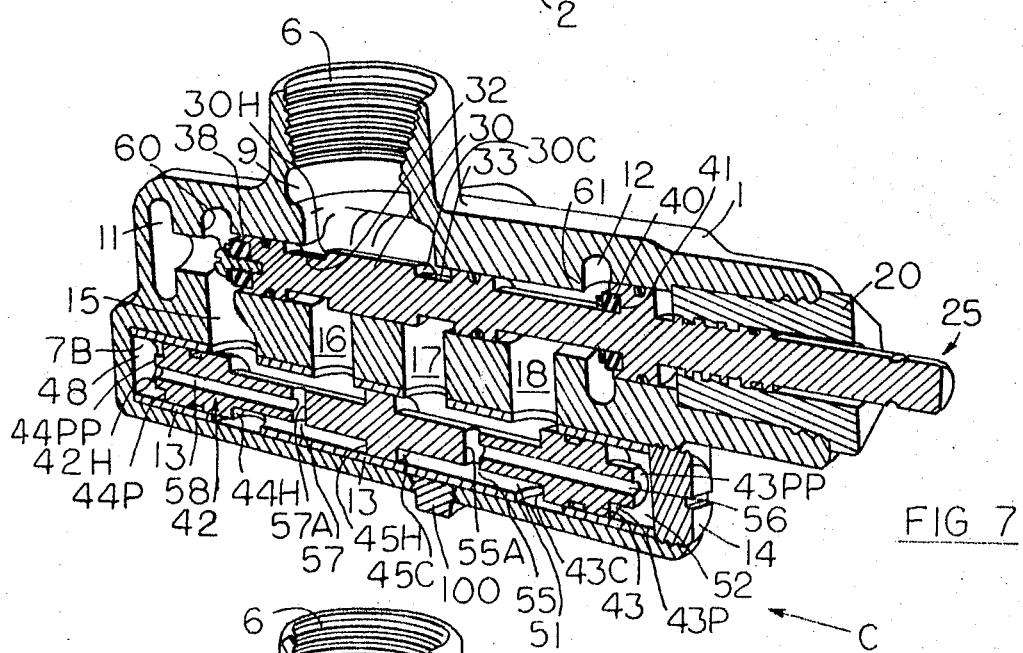
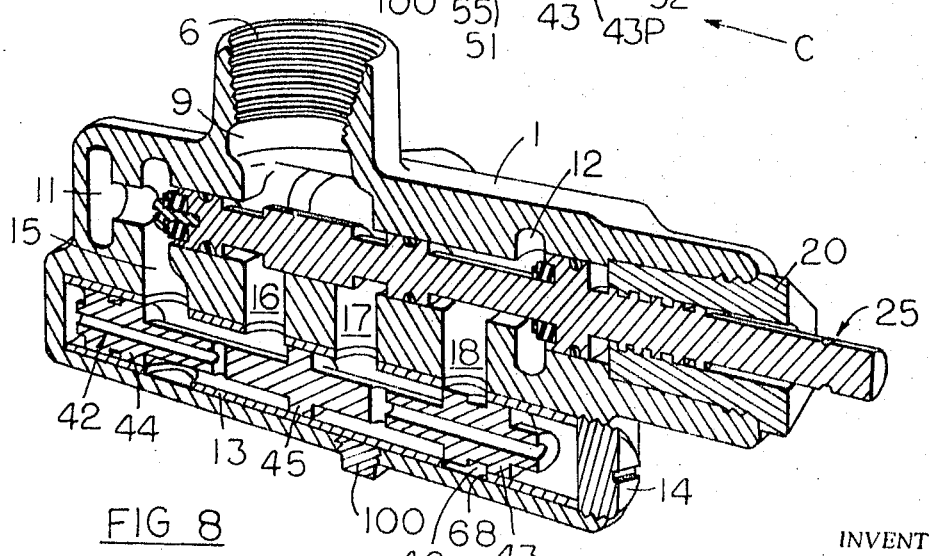
INVENTOR.
LAWRENCE EVERTON BOWMAN
BY
William Frederick Werner
ATTORNEY July 22, 1969
L. E. BOWMAN
3,456,670
MIXING VALVE
Filed July 18, 1966
3 Sheets-Sheet 3
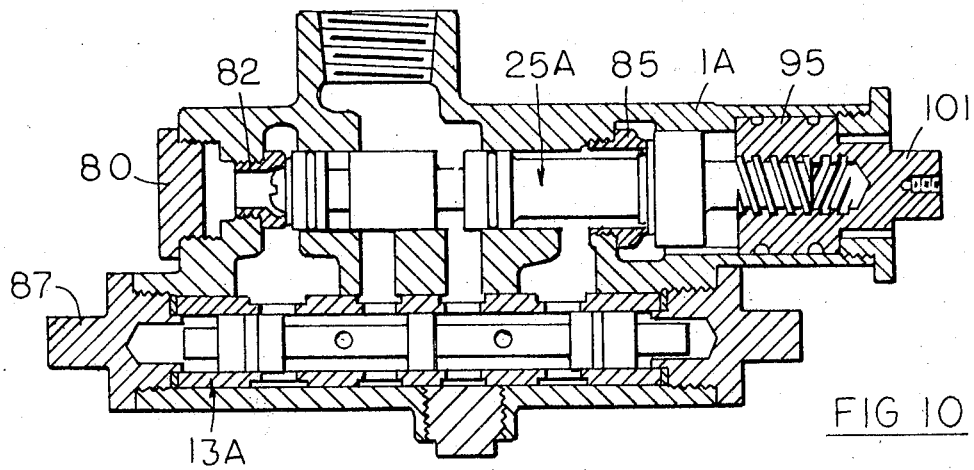
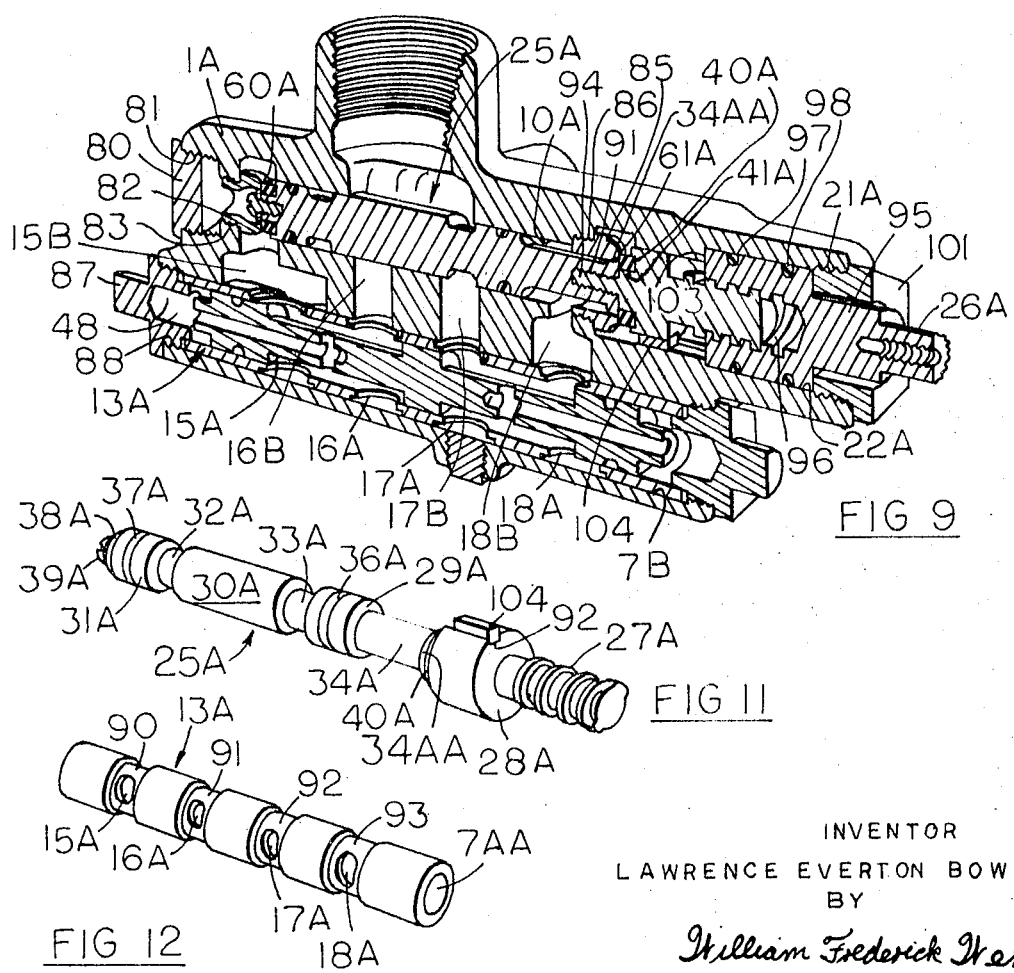
INVENTOR
LAWRENCE EVERTON BOWMAN
BY
William Frederick Werner
ATTORNEY United States Patent Office 3,456,670
Patented July 22, 1969

3,456,670
MIXING VALVE
Lawrence Everton Bowman, Warwick, R.I., assignor to Leonard Valve Company, Cranston, R.I., a corporation of Rhode Island
Filed July 18, 1966, Ser. No. 566,017
Int. Cl. F16k 19/00, 11/07
U.S. Cl. 137—100        8 Claims

ABSTRACT OF THE DISCLOSURE

The invention relates to bath room shower hot and cold water mixing valves and incorporates the structural feature of an equalizing valve for maintaining the mixed waters at a preselected temperature regardless of the variation of temperature or pressure of the respective, hot and/or cold water supply.

---

This invention relates to mixing valves for fluids under the same or relatively different pressures and temperatures and more particularly in an improved mechanism for automatically regulating the flow of the respective fluids to cause delivery of the mixture at a uniform temperature irrespective of variations in fluid pressures of the respective liquids.

An object of the present invention is to provide a mixing valve which may be set to deliver water at a predetermined temperature and which contains an equalizing valve operable to maintain the delivery of water at the selected temperature irrespective of variations in the pressures of the hot and cold water.

Another object of the present invention is to provide a mixing valve for hot and cold water under pressure, such as are utilized in connection with shower baths, or bath tubs, and which is so constructed that cold water will always flow through the valve first and thereby provide a non-scald valve.

And still another object of the present invention is to provide a mixing valve with a construction which provides extreme accuracy in maintaining the selected temperature of the mixed fluids and with ready and easy access to the equalizing valve and to the control stem for servicing, especially cleaning the respective parts of accumulated dirt, sand, grit and deposits normally found in valves used in water lines.

Other objects of the present invention will become apparent in part and be pointed out in part in the following specification and claims.

Referring to the drawings in which similar characters of reference refer to like parts:

FIGURE 1 is a perspective view of the new and improved mixing valve.

FIGURE 2 is a vertical cross sectional view, taken on a medial line of FIGURE 1, showing the shut-off and temperature control stem in valve closed position.

FIGURE 3 is a vertical cross sectional view, taken on line 3—3 of FIGURE 1.

FIGURE 4 is a perspective view of the shut-off and temperature control stem.

FIGURE 5 is a perspective view of the equalizing valve.

FIGURE 6 is a horizontal cross sectional view, taken on a medial line of FIGURE 1.

FIGURE 7 is a view, similar to FIGURE 2 in which the shut-off and temperature control stem is shown in valve open position.

FIGURE 8 is a view, similar to FIGURES 2 and 7 showing the shut-off and temperature control stem in valve open position and the piston in hot fluid section open and cold fluid section closed.

FIGURE 9 is a view similar to FIGURE 1 showing a modified form of shut-off and temperature control stem and a modified form of bushing for the piston.

FIGURE 10 is an elevational view of FIGURE 9.

FIGURE 11 is a perspective view of the modified form of shut-off and temperature control stem.

FIGURE 12 is a perspective view of the modified form of piston bushing.

In proceeding with this invention, there is illustrated in FIGURES 1, 2 and 3, a valve body 1 which may be in the form of a cored casting, having a hot water inlet 2 and a cold water inlet 3, which may be threaded so as to be connected, respectively, to pipes (not shown) supplying, respectively, hot fluids and cold fluids, and an outlet 6 adapted to be connected to a suitable delivery pipe (not shown) for the mixed fluids.

The valve body 1 is provided with an axial bore or chamber 7 having an open end provided with screw threads 8. Valve body 1 is also provided with an axial passageway 10, a hot fluid inlet passage 11, which connects hot fluid inlet 2 with axial passageway 10, and a cold fluid inlet passage 12 which connects cold fluid inlet 3 with axial passageway 10. A mixing compartment 9 is in communication with axial passageway 10 and outlet 6.

A liner 13 provided with a chamber 7A is held in axial bore 7 by means of a drive fit. A plug 14 is rotatively mounted in screw threads 8 to close the open end of axial bore 7.

Valve body 1 is cored to provide fluid conduits, for water by way of example, and identified as hot water opening 15, hot water bore 16, cold water bore 17 and cold water opening 18. When liner 13 is used it is provided with suitable openings aligned with hot water opening 15, hot water bore 16, cold water bore 17 and cold water opening 18, so that axial passageway 10 is in communication with chamber 7A or axial bore or chamber 7.

A bushing 20 provided with screw threads 21, an axial bore 22, a long lead screw thread 23 in axial bore 22 is rotatively mounted in axial passageway 10 by means of screw threads 21.

A stem, generally indicated by reference numeral 25, is provided with a knurled end 26, a long lead screw thread 27, a cold water valve collar 28, a disk 29, a circular plug 30, a hot water valve collar 31, a hot water recess 32, a cold water recess 33, and a reduced area 34. An annular groove 35 in cold water valve collar 28 is adapted to house fluid packing 35A, illustrated as an O ring. Similarly, disc 29 is provided with an annular groove 36 adapted to house an O ring 36A and hot water valve collar 31 is provided with an annular groove 37 adapted to house an O ring 37A. A hot water valve packing 38 is fastened to one end of stem 25 by means of screw 39. A cold water valve packing 40 is fastened to cold water valve collar 28 by means of a circular recess 41.

Stem 25 is rotatively and slidably mounted in axial passageway 10 through engagement of long lead screw threads 27 engaging long lead screw threads 23. The function of stem 25 will presently appear.

An equalizing valve or piston, generally indicated by reference numeral 42, is provided with a cold water valve head 43, a hot water valve head 44 and a blocking head 45. A groove 46 is provided in cold water valve head 43. Similarly, a groove 50 is provided in hot water valve head 44. A cold water reduced area 53 lies between blocking head 45 and cold water valve head 43. Similarly, a hot water reduced area 54 lies between blocking head 45 and cold water valve head 43. Similarly, a hot water reduced area 54 lies between blocking head 45 and hot water valve head 44. A cold water port 55 is provided in cold water reduced area 53. A cold water passageway 56 extends from one end of piston 42 to port 55 which has a pressure wall 55A. Similarly, a hot water port 57 is provided in hot water reduced area 54. A hot water passageway 58 extends from one end of piston 42 to port 57 which has a pressure wall 57A.

Equalizing valve 42 in FIGURE 2 may be considered chamber 7A or in chamber 7 when liner 13 is not in use. It divides chamber 7A into four sections, namely, hot fluid section 47, a cold fluid section 51, a hot water pressure section 48, and a cold water pressure section 52.

The function of the valve will now be described. Reference is now made to FIGURE 2, wherein shut-off and temperature control stem 25 is shown in valve closed position. That is, valve packing 38 fastened to stem 25 engages a valve seat 60 provided in valve body 1 at the intersection of axial passageway 10 with hot water opening 15. In this manner, hot water flowing from hot water inlet 2 is blocked in inlet passage 11 at the hot water entrance to axial passageway 10.

Simultaneously, valve packing 40 fastened to stem 25 engages a valve seat 61 provided in valve body 1 at the intersection of axial passageway 10 with cold water passage 12 which connects cold water inlet 3 with axial passageway 10 and cold water opening 18.

Equalizing valve 42 in FIGURE 2 may be considered to be in normal pressurized position.

FIGURE 7 shows the shut-off and temperature stem 25 in valve open position. In going from stem 25 position in FIGURE 2 (closed) to the stem position 25 in FIGURE 7 (open) knurled end 26 of stem 25 in FIGURE 2 is manually rotated. In the course of the first revolution of stem 25, three events on stem 25 take place simultaneously. First, valve packing 40 moves away from valve seat 61 to permit cold water to flow from cold water passageway 12 to axial passageway 10, into cold water opening 18 to cold fluid section 51, to cold water bore 17 into mixing compartment 9 and into outlet 6. As shown in FIGURE 2, equalizing valve 42 permits cold water to freely pass from cold water opening 18 to cold water bore 17 through cold water section 51.

Secondly, valve packing 38 moves away from valve seat 60 to permit hot water to flow from inlet passageway 11 through a short section of axial passageway 10 to hot water opening 15, to hot fluid section 47, to hot water bore 16 where, thirdly, circular plug 30 blocks the flow of hot water into mixing compartment 9 until stem 25 is rotated sufficiently to slide circular plug 30, to the right in FIGURE 2, so that hot water recess 32, at least partially registers or aligns with hot water bore 16. In that event, hot water from bore 16 passes through recess 32 into hot and cold water mixing compartment 9. It will be observed that circular plug 30 always assures that cold water will first flow from outlet 6. Therefore, the user of the valve will never be scalded with hot water. In addition the hot water always flows into the cold water in mixing compartment 9.

The piston type of equalizing valve 42 is freely slidable in axial bore or chamber 7. However, for ease of manufacture and for a longer wearing life liner 13 provided with chamber 7A accommodates the free sliding movement of equalizing valve 42. Two relief ports 65 and 68 are provided in liner 13 opposite, respectively, hot water opening 15 and cold water opening 18, for purposes which will presently appear.

With the initial rotation of stem 25 and the movement of valve packing 40 away from valve seat 61 water will surge from cold water passageway 12 into axial passageway 10 and into cold water opening 18 and into cold water section 51 where it will act on surface 45C to move equalizing valve 42 and simultaneously act on surface 43C to move valve 42 in a direction opposite to arrow C. Since surfaces 45C and 43C are equal in area, valve 42 is static or unaffected by the water pressure. However, the water in cold water section 51 will enter port 55 and flow through axial passageway 56 into cold water pressure chamber 52 to act on surfaces 43P and 43PP and pressure wall 55A. The water pressure acting on the combined area of these surfaces 43P, 43PP and 55A will move equalizing valve 42 in the direction of arrow C unless there is a counterforce on valve 42, which would be provided by hot water pressure.

Assuming that momentarily there is no hot water pressure. Then the end 42H of valve 42 will abut end wall 7B. This will place cold water valve head 43 in a position to block cold water opening 18, as shown in FIGURE 8, and in effect stop the flow of cold water to mixing compartment 9 and outlet 6. Cold water pressure will act on the outside diameter of cold water valve head 43 and tend to force valve head 43 against the liner 13 on the surface opposite cold water opening 18. To counteract this water pressure relief port 68 is provided. The groove 46 delivers water pressure to relief port 68 so that the water pressure equalized itself on valve head 43. Relief port 68 also removes a surface area against which valve head 43 may bind under the influence of fluid pressure.

With the advent of hot water flowing from hot water inlet 11 into hot water opening 15 as valve packing 38 is moved away from valve seat 60 simultaneously with the movement of valve packing 40 away from valve seat 61 hot water flows into hot fluid section 47 to act on surfaces 44H and 45H, to produce a static condition on equalizing valve 42 because surfaces 44H and 45H are equal in area. The water in hot fluid section 47 will enter port 57 and flow through axial passageway 58 into hot water pressure section 48 to act on surfaces 44P and 44PP and pressure wall 57A. The water pressure acting on the combined area of surfaces 44P and 44PP and 57A will move equalizing valve 42 in the direction opposite to arrow C and thereby provide a counterforce to the direction of force acting on surfaces 43P, 43PP and 55A. Thus it becomes a question of which force is greater the cold water pressure or the hot water pressure since the opposite areas are all equal.

Continued rotation of stem 25 will move the stem 25 in a direction opposite to the direction indicated by arrow C. A pointer (shown in FIG. 1) will be located on knurled end 26 so that stem 26 will be rotated until the pointer is brought into register with an indicator (not shown) showing the temperature of the water passing through outlet 6.

FIGURE 7 illustrates stem 26 and equalizing valve 42 in operative position for a selected degree of hot water. It will be noted that surface 30H is located in register with hot water bore 16 so that hot water may pass from hot water bore 16 to hot water recess 32 and into mixing compartment 9 to outlet 6; and that surface 30C is located in register with cold water bore 17 so that cold water may pass from cold water bore 17 to cold water recess 33 and into mixing compartment 9 to outlet 6. So long as the hot water pressure and the cold water pressure remain constant, equalizing valve 42 will remain as positioned in FIGURE 7. However, if a toilet is flushed and the cold water pressure drops, then the cold water pressure acting on surfaces 43P, 53PP and 55A will drop. Therefore, the hot water pressure acting on surfaces 44P, 44PP and 57A will move equalizing valve 42 in a direction opposite to arrow C, thereby positioning hot water valve head 44 in a position to block hot water opening 15 to diminish the volume of hot water which can flow from hot fluid section 47 to hot water bore 16 and on to mixing compartment 9. In this manner, the temperature of the water in mixing compartment 9 is maintained.

It will be further noted that O ring fluid packings 35A 36A confine the cold water supply within that section of axial passageway 10 that lies between them. Similarly, O ring fluid packings 37A and 36A confine the hot water supply within that section of axial passageway 10 that lies between them.

A drain plug 100 may be provided in valve body 1.

Reference is now made to FIGURES 9, 10, 11, 12 where a modified form of shut-off and temperature control stem 25A and a modified form of liner 13A is illustrated. Valve body 1 is slightly modified to permit cleaning and easy replacement of the several parts. Function, as described above, is not changed by the modifications in structure.

Wall A in valve body 1, FIGURE 2, is replaced in FIGURES 9 and 10 by a plug 80 rotatively mounted in threads 81 provided in valve body 1A. Valve seat 60 provided in valve body 1, FIGURE 2 is replaced in FIGURES 9 and 10 by a bushing 82 rotatively mounted in threads 83 provided in valve body 1A. Bushing 82 is provided with a valve seat 60A. Valve seat 61 FIGURE 2, is replaced in FIGURES 9 and 10, by a bushing 85 rotatively mounted in threads 86 provided in valve body 1A. Bushing 85 is provided with a valve seat 61A. Wall B in valve body 1, FIGURE 2, is replaced in FIGURES 9 and 10 by a plug 87 rotatively mounted in threads 88 provided in valve body 1A.

Reference numeral 13A, generally indicates, the modified form of liner 13, and is provided with four circular recesses 90, 91, 92 and 93. Hot water opening 15A is provided in the wall of liner 13A, in the area in register ister with circular recess 90. Hot water bore 16A is provided in the wall of line 13A, in the area in register with circular recess 91. Cold water bore 17A is provided in the wall of liner 13A, in the area in register with circular recess 92. Cold water opening 18A is provided in the wall of liner 13A, in the area in register with circular recess 93. Liner 13A provided with a chamber 7AA is fastened in axial bore 7B, by means of a drive fit, provided in valve body 1A.

The advantage of grooves 90, 91, 92 and 93 is that hot water opening 15A in liner 13A need not be aligned with the hot water opening 15B provided in valve body 1A to provide fluid communication between opening 15A and opening 15B, since the circular recess 90 provides a path for such communication. In like manner circular recesses 91, 92, 93 provide paths for communication between the respective bores 16B, 17B and opening 18B.

The shut-off and temperature control stem 25A, FIGURES 9, 10 and 11 consists of three sections. The first section consists of a reduced area 34A, a sliding disk 29A having an annular groove 36A, a cold water recess 33A, a circular plug 30A, a hot water recess 32A, a hot water valve collar 31A having an annular groove 37A and a valve packing 38A fastened to hot water valve collar 31A by means of screw 39A. Reduced area 34A is provided with a screw thread 91.

The second section consists of a cold water valve collar 28A provided with a key way 92, a circular recess 41A, a projection 94 provided with threads which rotatively engage threads 91 and a long lead screw thread 27A.

A fluid tight packing 40A is located in circular recess 41A. A collar 34AA on the end of reduced area 34 holds packing 40A in recess 41A.

The third section is a bushing 95 provided with a long lead screw thread 96 which rotatively engages long lead screw thread 27A and two circular recesses which house fluid packing O rings 97, 98.

Bushing 95 rotatively engages axial bore 22A in valve body 1A. A nut 101 rotatively engages screw threads 21A provided in the wall of axial bore 22A and holds bushing 95 in rotational postion in axial bore 22A against shoulder 103 located in valve body 1A at the end of axial bore 22A.

In operation, knurled end 26A of bushing 95 will be manually rotated. Bushing 95 will rotate a key 104 located in key way 92 and a companion key way in valve body 1A will prevent cold water valve collar 28A from rotating but not from sliding. Long lead screw threads 96 rotating with bushing 95 will push or draw long lead screw threads 27A so that cold water valve collar 28A and circular plug 30A attached thereto by means of screw threads 91, will slide circular plug 30, hot water valve collar 31A, sliding disk 29A and cold water valve collar 28A in axial passageway 10A located in housing 1A.

The sliding movement of packing 38A and 40A against their respective valve seats 60A and 61A provides a longer wearing packing because the packings are not rotated against their respective valve seats under pressure. Rather the packings are pushed or slid into valve seating engagement.

Having shown and described preferred embodiments of the present invention by way of example, it should be realized that structural changes could be made and other examples given without departing from either the spirit or scope of this invention.

What I claim is:

1. A mixing valve for fluids under pressure having different temperatures comprising a valve body having a hot fluid inlet, a cold fluid inlet, a mixing compratment provided with an outlet, an axial passageway in communication with said hot fluid inlet, said cold fluid inlet and said mixing compartment, a hot water valve seat and a cold water valve seat provided in said valve body and located in said axial passageway, a chamber, conduit means connecting said chamber with said hot fluid inlet and said cold fluid inlet and with said axial passageway and said mixing compartment, a shut-off and temperature control stem located in said axial passageway and having means for simultaneously engaging and disengaging said hot fluid valve seat and said cold fluid valve seat, said shut-off and temperature control stem provided with additional means for blocking and unblocking said conduit means, and an equalizing valve freely movable in said chamber and having means separating said chamber into a hot fluid section and cold fluid section, and means for subjecting the opposite ends to the opposing pressures of the hot fluid and the cold fluid, thereby causing movement thereof so to regulate the flow of the respective fluid in to and out of the hot fluid section and cold fluid section, through said conduit means, at a substantially uniform pressure to maintain a substantially uniform fluid temperature in said mixing compartment, and further means for moving said shut-off and temperature control stem to control the volume of fluid flowing into said hot fluid section and cold fluid section and the volume of hot fluid and the volume of cold fluid flowing from said conduit means into said mixing compartment.

2. A mixing valve for fluids under pressure having different temperatures comprising a valve body having a hot fluid inlet, a cold fluid inlet, a mixing compartment provided with an outlet, an axial passageway in communication with said hot fluid inlet, said cold fluid inlet and said mixing compartment, a chamber in communication with said axial passageway through a hot fluid opening, a hot fluid bore, a cold fluid opening, a cold fluid bore, a hot fluid valve seat and a cold fluid valve seat located in said axial passageway, a shut-off and temperature control stem located in said axial passageway and having means for simultaneously engaging and disengaging said hot fluid valve seat and said cold fluid valve seat, said temperature control stem provided with additional means for blocking and unblocking said hot fluid bore, and an equalizing valve freely movable in said chamber and having a blocking head separating said chamber into a hot fluid section and a cold fluid section, said hot fluid opening directing fluid into said hot fluid section, said hot fluid bore directing fluid out of said hot fluid section, said cold fluid opening directing fluid into said cold fluid section, said cold fluid bore directing fluid out of said cold fluid section, and means for subjecting the opposite ends of the equalizing valve to the opposing pressures of the fluids, thereby causing longitudinal movement thereof so to regulate the flow of the respective fluid in to and out of the hot fluid section and the cold fluid section, at a substantially uniform pressure to maintain a substantially uniform temperature in said mixing compartment, and further means for moving said shut-off and temperature control stem to simultaneously engage and disengage said hot fluid valve seat and said cold fluid valve seat to control the volume of fluid flowing into said hot fluid opening and said cold fluid opening and the volume of fluid flowing out of said hot fluid bore and said cold fluid bore.

3. A mixing valve for fluids under pressure having different temperatures comprising a valve body having a hot water inlet, a cold water inlet, a mixing compartment provided with an outlet, an axial passageway in communication with said hot water inlet, said cold water inlet and said mixing compartment, a chamber in communication with said axial passageway through a hot water opening, a hot water bore, a cold water opening, a cold water bore, a hot water valve seat and a cold water valve seat located in said axial passageway, a shut-off and temperature control stem movable in said axial passageway, said stem having a cold water valve collar provided with a cold water valve packing engageable and disengageable with said cold water valve seat, a hot water valve collar provided with a hot water valve packing engageable and disengageable with said cold water valve seat, a disk in blocking position between said cold water opening and cold water bore, a circular plug movable into and out of engagement with said hot water bore and cold water bore, a hot water recess movable in to and out of register position with said hot water bore, a cold water recess movable into and out of register position with said cold water bore, and a reduced area in register with said cold water opening, and an equalizing valve freely movable in said chamber and having a blocking head separating said chamber into a hot water section and a cold water section, said hot water opening and hot water bore in communication with said hot water section, said cold water opening and said cold water bore in communication with said cold water section, a hot water valve head on one end and a cold water valve head on the opposite end of said equalizing valve, means subjecting said hot water valve head and cold water valve head to opposing pressures, respectively, of cold water and hot water, thereby causing longitudinal movement thereof so as to regulate the flow of the respective water into and out of the hot water section and the cold water section, at a substantially uniform pressure to maintain a substantially uniform temperature in said mixing compartment, and further means for moving said shut-off and temperature control valve to simultaneously engage and disengage said hot water valve seat and said cold water valve seat to control the volume of fluid flowing into said hot water opening and said cold water opening and the volume of fluid flowing out of said hot water bore and said cold water bore.

4. A structure as claimed in claim 3 being further characterized by: a groove provided in said cold water valve head, and another groove provided in said hot water valve head.

5. A structure as claimed in claim 4 being further characterized by: said chamber having a liner provided with suitable openings aligned, respectively, with said hot water opening, hot water bore, cold water opening and cold water bore, said liner also having two relief ports located respectively, diametrically opposite to said hot water opening, and said cold water opening, whereby, when said cold water valve head and said groove therein are aligned with said cold water opening water pressure may act on opposite sides of said cold water valve head to equalize the water pressure acting upon said cold water valve head, similarly, when said hot water valve head and said groove therein are aligned with said hot water opening, water pressure may act on opposite sides of said hot water valve head to equalize the water pressure acting upon said hot water valve head.

6. A structure as claimed in claim 5 being further characterized by: said liner having a circular recess aligned at each of said suitable openings.

7. A structure as claimed in claim 3 being further characterized by: a cold water valve collar provided with a key way, and a projection provided with long lead screw threads, means fastening said cold water valve collar to said shut-off and temperature control stem, a key, means fastening said key in said valve body and in said key way to prevent rotation of said cold water valve collar in said axial passageway, a bushing provided with a long lead screw thread rotatively mating with said first mentioned long lead screw thread, said bushing rotatively mounted in said axial passageway, and means to rotatively fasten said bushing in said axial passageway, whereby, rotation of said bushing reciprocatingly slides said shut-off and temperature control stem in said axial passageway.

8. A mixing valve consisting of a valve body having an axial passageway, a mixing compartment provided with an outlet in communication with said axial passageway, a hot water inlet and a cold water inlet in communication with said axial passageway, a chamber in said valve body, a hot water opening, a hot water bore, a cold water opening, a cold water bore, providing four conduits between said axial passageway and said chamber, a hot water valve seat and a cold water valve seat located in said axial passageway, a stem movable in said axial passageway, said stem having a cold water valve collar, a cold water valve packing, means fastening said cold water valve packing to said cold water valve collar, a hot water valve collar, a hot water valve packing, means fastening said hot water valve packing to said hot water valve collar, said cold water valve packing engageable and disengageable with said cold water valve seat, said hot water packing engageable and disengageable with said hot water valve seat, a disk movable into and out of blocking positioning with said cold water bore, a circular plug movable into and out of engagement with said hot water bore, a hot water recess movable into and out of blocking position with said hot water bore, a cold water recess movable into and out of blocking position with said cold water bore, and a reduced area in register with said cold water opening, a long lead screw thread, a bushing provided with a long lead screw thread rotatably engaging said first mentioned long lead screw thread, means fastening said bushing in said axial passageway, an equalizing valve freely movable in said chamber and provided with a cold water valve head movable into and out of blocking position with said cold water opening, a hot water valve head movable into and out of blocking position with said hot water opening, a blocking head, said hot water valve head and said cold water valve head in cooperation with said blocking head dividing said chamber into four sections including a hot water pressure section and a cold water pressure section, a hot water section between said blocking head and said hot water valve head, a cold water section between said cold water valve head and said blocking head, a hot water reduced area between said blocking head and hot water valve head, a cold water reduced area between said blocking head and cold water valve head, a cold water port in said cold water reduced area, a cold water passageway in said cold water valve head and in said cold water reduced area providing a connection for said cold water port with the cold water section and said cold water pressure section of said chamber, a hot water port in said hot water reduced area, and a hot water passageway in said hot water valve collar and in said hot water reduced area providing a connection for said hot water port with the hot water section and with said hot water pressure section of said chamber, to thereby provide means for subjecting the end of said hot water valve head and the end of said cold water valve head to the opposing pressures of the respective fluids, for longitudinal movement of said equalizing valve; movement of said stem and said cold water valve packing away from said cold water valve seat providing a path for cold water to flow from said cold water inlet to and through said cold water opening and past said cold water valve head to said cold water section of said chamber, to and through said cold water bore to and past said cold water recess in said axial passageway to said mixing compartment and said outlet, movement of said stem simultaneously moving said hot water valve packing away from said hot water valve seat to provide a path for hot water to flow from said hot water inlet port to and through said hot water opening past said hot water valve collar to said hot water section of said chamber, to and through said hot water bore to and past said hot water recess in said axial passageway to said mixing chamber and said outlet, said equalizing valve being sensitive to difference in pressure between cold water pressure and hot water pressure to move in the direction of the lowest pressure to block the path of fluid having the highest pressure from said chamber.

References Cited
UNITED STATES PATENTS

| | | | |
|---|---|---|---|
| 1,291,183 | 1/1919 | Schulder | 251—268 |
| 2,470,025 | 5/1949 | Fraser | 137—100 |
| 2,679,861 | 6/1954 | Campbell | 137—99 |

ALAN COHAN, Primary Examiner

H. M. COHAN, Assistant Examiner

U.S. Cl. X.R.

137—607